UNITED STATES PATENT OFFICE.

WILLIAM C. ARSEM, OF SCHENECTADY, NEW YORK, ASSIGNOR TO GENERAL ELECTRIC COMPANY, A CORPORATION OF NEW YORK.

VULCANIZED GLYCEROL RESIN.

1,082,106.

Specification of Letters Patent.

Patented Dec. 23, 1913.

No Drawing. Application filed March 8, 1913. Serial No. 752,977.

*To all whom it may concern:*

Be it known that I, WILLIAM C. ARSEM, a citizen of the United States, residing at Schenectady, county of Schenectady, State of New York, have invented certain new and useful Improvements in Vulcanized Glycerol Resin, of which the following is a specification.

The present invention comprises a new synthetic rubber-like material and the process of making the same.

I have discovered that when a mixed ester of glycerol, or other polyhydric alcohol, and of both a saturated and an unsaturated organic acid, is acted upon by sulfur, that a rubbery, infusible mass is formed which can be used for many purposes to replace rubber.

In the preferred form of my invention the mixed ester is prepared as follows: An ester containing free hydroxyl groups is first prepared by heating glycerol and phthalic anhydrid to a reaction temperature, say about 200 to 210° C., until gas bubbles cease arising. I prefer to use molecular proportions, these corresponding by weight with about 92 parts of glycerol and 148 parts of phthalic anhydrid but in some cases I may use less phthalic anhydrid and more of the unsaturated acid which is subsequently added. At this stage of the reaction some thickening takes place but it should be interrupted before a jelly-like mass forms. To the resulting mass one molecular proportion, or 282 parts by weight of oleic acid is added and heating resumed. Gas and steam are again formed and at 192 to 195° C. the bottom layer of resin becomes opaque. After continued heating at about 210 to 215° C. the resin and the oleic acid will mix to form a mixture having a deep red color. The temperature should be maintained below 230° C. as considerable frothing will occur if it rises above this point. Care should be taken to prevent this by agitating the mixture and regulating the heat and if this is done a gentle reaction will go on which is completed after several hours. The resin at this stage is a viscous red liquid. This resin is described and claimed in a co-pending application, Serial No. 781,111, filed July 25, 1913. About 20 parts of finely divided sulfur are now added to the resin and thoroughly distributed by stirring. The heating is then resumed with continual stirring until reaction occurs. A dark, brown elastic mass having a faint rubber-like odor is formed. The proportion of sulfur may be varied considerably and may be as low as 10% and as high as 30%.

In some cases substances such as castor oil or pitch may to advantage be added to the glycerol resin and this mixture treated with sulfur as above described. To 100 parts of the glycerol resin of oleic and phthalic acid, about 1 to 10 parts of either castor oil or pitch is added and the mixture is then acted upon with 10 to 30 parts of sulfur. These additions modify the consistency and elasticity of the product. I find that mechanical kneading or working is also beneficial to improve the mechanical products of the rubber-like compound.

The final product is infusible, will stand 200° C. without apparent change, but when heated, strongly decomposes and chars like rubber. It is attacked somewhat by xylene, benzene, but is otherwise insoluble in ordinary solvents. When used for the production of molded compounds it may be mixed with a filler such as talc, zinc oxid, finely powdered silica or other inert material, and in some cases a certain amount of ground rubber may also be added. The material is substantially equal to rubber for various uses, for example, stoppers, erasers, pads, washers, insulation, molded materials and the like. Equivalent amounts of other unsaturated acid such as cinnamic acid may be used to replace the oleic acid in part or entirely. In the same manner glycerol may be replaced by its polymers.

What I claim as new and desire to secure by Letters Patent of the United States, is:—

1. The process which consists in heating a mixed glycerol ester of phthalic anhydrid and oleic acid with sulfur until reaction takes place with the formation of a rubber-like mass.

2. The process which consists in heating a mixed ester of a polyacid alcohol containing an unsaturated acid with sulfur until reaction takes place with the formation of a rubber-like mass.

3. The process which consists in heating a mixture of a glycerol ester of phthalic and oleic acids and sulfur until reaction occurs.

4. A rubbery, infusible composition comprising a sulfurized mixed ester of a polybasic saturated acid, and an unsaturated acid.

5. A rubber-like, infusible composition comprising a compound of sulfur and the glycerol ester of phthalic and oleic acids.

6. A rubber-like compound of an ester of phthalic and oleic acids, and sulfur.

In witness whereof, I have hereunto set my hand this 6th day of March, 1913.

WILLIAM C. ARSEM.

Witnesses:
BENJAMIN B. HULL,
HELEN ORFORD.